US012074688B2

(12) United States Patent
Werner et al.

(10) Patent No.: US 12,074,688 B2
(45) Date of Patent: Aug. 27, 2024

(54) NETWORK NODE AND METHOD PERFORMED THEREIN FOR GENERATING A RADIO INTERFERENCE MITIGATION REFERENCE SIGNAL SEQUENCE

(71) Applicant: Telefonaktiebolaget LM Ericsson (publ), Stockholm (SE)

(72) Inventors: Karl Werner, Segeltorp (SE); Sebastian Faxér, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 178 days.

(21) Appl. No.: 17/430,485

(22) PCT Filed: Feb. 15, 2020

(86) PCT No.: PCT/SE2020/050170
§ 371 (c)(1),
(2) Date: Aug. 12, 2021

(87) PCT Pub. No.: WO2020/167241
PCT Pub. Date: Aug. 20, 2020

(65) Prior Publication Data
US 2022/0149965 A1    May 12, 2022

Related U.S. Application Data

(60) Provisional application No. 62/806,568, filed on Feb. 15, 2019.

(51) Int. Cl.
*H04L 25/02* (2006.01)
*H04J 11/00* (2006.01)
*H04L 5/00* (2006.01)

(52) U.S. Cl.
CPC ........ *H04J 11/0023* (2013.01); *H04L 5/0048* (2013.01); *H04L 25/0226* (2013.01)

(58) Field of Classification Search
CPC . H04J 11/0023; H04L 25/0226; H04L 5/0048
See application file for complete search history.

(56) References Cited

U.S. PATENT DOCUMENTS

2007/0211678 A1\* 9/2007 Li ................... H04L 5/0035
713/168
2015/0098440 A1 4/2015 Yang et al.
(Continued)

FOREIGN PATENT DOCUMENTS

CN    101322312 A    12/2008
EP    2949166 B1     12/2015

OTHER PUBLICATIONS

International Search Report and Written Opinion dated May 4, 2020 for International Application No. PCT/SE2020/050170 filed Feb. 15, 2020, consisting of 11-pages.
(Continued)

*Primary Examiner* — Mansour Oveissi
(74) *Attorney, Agent, or Firm* — Weisberg I.P. Law, P.A.

(57) ABSTRACT

A method and network node for scrambling radio interference mitigation reference signals (RIM-RS) are disclosed. According to one aspect, a network node is configured to generate an initialization seed computed by linearly combining a function of a time counter t and a function of a scrambling identifier, $N_{ID}$. The network node is further configured to generate a radio interference mitigation reference signal (RIM-RS) sequence based at least in part on the initialization seed.

19 Claims, 12 Drawing Sheets

(56) References Cited

U.S. PATENT DOCUMENTS

2016/0374098 A1   12/2016   Jongren et al.
2021/0385035 A1*  12/2021   Ghozlan .................. H04L 5/14

OTHER PUBLICATIONS

International Preliminary Report on Patentability dated Jun. 17, 2021 for International Application No. PCT/SE2020/050170 filed Feb. 15, 2020, consisting of 19-pages.
3GPP TR 38.866 V16.0.0; 3rd Generation Partnership Project; Technical Specification Group Radio Access Network; Study on remote interference management for NR (Release 16), Dec. 2018, consisting of 31-pages.
3GPP TSG-RAN WG1 #91 R1-1721383; Title: Sequence initialization for DMRS and CSI-RS; Agenda Item: 7.2.3.8; Source: Ericsson; Document for: Discussion and Decision; Date and Location: Nov. 27-Dec. 1, 2017, Reno, USA, consisting of 11-pages.
3GPP TSG RAN WG1 Meeting #94 R1-1808842; Title: Discussion on RS design for RIM; Agenda Item: 7.2.5.3; Source: CMCC; Document for: Discussion; Date and Location: Aug. 20-24, 2018, Gothenburg, Sweden, consisting of 12-pages.
3GPP TSG RAN WG1 Ad-Hoc Meeting 1901 R1-1900894; Title: RIM RS design and configurations; Agenda Item: 7.2.5.3 RIM RS resource and configurations; Source: Qualcomm Incorporated; Document for: Discussion and Decision; Date and Location: Jan. 21-25, 2019, Taipei, consisting of 3-pages.
3GPP TSG RAN WG1 Meeting Ad-Hoc Meeting 1901 R1-1903034; Title: On RIM RS resource and configurations; Agenda Item: 7.2.5.3; Source: Ericsson; Document for: Discussion and Decision; Date and Location: JFeb. 25-Mar. 1, 2019, Athens, Greece, consisting of 9-pages.
3GPP TS 38.211 V15.4.0; 3rd Generation Partnership Project; Technical Specification Group Radio Access Network; NR: Physical channels and modulation (Release 15), Dec. 2018, consisting of 96-pages.
Indian Office Action dated Mar. 11, 2022 for application No. 202117031490 filed Jul. 13, 2021, consisting of 6 pages.
Chinese Office Action and English language machine translation dated Aug. 31, 2023 for Application No. 202080014358.3, consisting of 8 pages.

* cited by examiner

NETWORK NODE AND METHOD PERFORMED THEREIN FOR GENERATING A RADIO INTERFERENCE MITIGATION REFERENCE SIGNAL SEQUENCE

CROSS-REFERENCE TO RELATED APPLICATIONS

This application is a Submission Under 35 U.S.C. § 371 for U.S. National Stage Patent Application of International Application No: PCT/SE2020/050170, filed Feb. 15, 2020, entitled "NETWORK NODE AND METHOD PERFORMED THEREIN FOR GENERATING A RADIO INTERFERENCE MITIGATION REFERENCE SIGNAL SEQUENCE," which claims priority to U.S. Provisional Application No. 62/806,568, filed Feb. 15, 2019, entitled "SCRAMBLING OF RADIO INTERFERENCE MITIGATION REFERENCE SIGNAL SEQUENCES," the entireties of both of which are incorporated herein by reference.

TECHNICAL FIELD

The present disclosure relates to wireless communications, and in particular, to a network node and corresponding method for generating a radio interference mitigation reference signal (RIM-RS) sequence.

BACKGROUND

NR Frame Structure

The next generation mobile wireless communication system (5G) (also known as New Radio (NR)), supports a diverse set of use cases and a diverse set of deployment scenarios. The latter includes deployment at both low frequencies (100 s of MHz), similar to Long Term Evolution (LTE) today, and very high frequencies (mm waves in the tens of GHz).

Similar to LTE, NR uses Orthogonal Frequency Division Multiplexing (OFDM) in the downlink (i.e., from a network node, gNB, eNB, or base station, to a wireless device (WD)). The basic NR physical resource over an antenna port can thus be seen as a time-frequency grid as illustrated in FIG. 1, where a resource block in a 14-symbol slot is shown. A resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f=(15\times2^\alpha)$ kHz where $\alpha \in (0,1,2,3,4)$. $\Delta f=15$ kHz is the basic (or reference) subcarrier spacing that is also used in LTE.

In the time domain, downlink and uplink transmissions in NR will be organized into equally-sized subframes of 1 ms each, similar to LTE. A subframe is further divided into multiple slots of equal duration. The slot length for subcarrier spacing $\Delta f=(15\times2^\alpha)$ kHz is $\frac{1}{2^\alpha}$ ms. There is only one slot per subframe at $\Delta f=15$ kHz and a slot consists of 14 OFDM symbols.

Downlink transmissions are dynamically scheduled, i.e., in each slot the gNB transmits downlink control information (DCI) about which WD data is to be transmitted to, and which resource blocks in the current downlink slot the data is transmitted on. This control information is typically transmitted in the first one or two OFDM symbols in each slot in NR. The control information is carried on the Physical Downlink Control Channel (PDCCH) and data is carried on the Physical Downlink Shared Channel (PDSCH). A WD first detects and decodes PDCCH and if a PDCCH is decoded successfully, the WD then decodes the corresponding PDSCH based on the decoded control information in the PDCCH. In addition to PDCCH and PDSCH, there are also other channels and reference signals transmitted in the downlink.

Uplink data transmissions, carried on a Physical Uplink Shared Channel (PUSCH), are also dynamically scheduled by the gNB by transmitting a DCI message. For time division duplex (TDD) operation, the DCI (which is transmitted in the downlink (DL) region) may indicate a scheduling offset so that the PUSCH is transmitted in a slot in the uplink (UL) region.

Interference Protection in TDD Networks

Wireless cellular networks are built up of cells, each cell defined by a certain coverage area of a radio base station (BS), which is an example of a network node to which the disclosure presented herein applies. The BSs wirelessly communicate with terminals/wireless devices (WD) in the network. The communication is carried out in either paired or unpaired spectrum. In case of paired spectrum, the DL and UL directions are separated in frequency, called Frequency Division Duplex (FDD). In case of unpaired spectrum, the DL and UL use the same spectrum, called Time Division Duplex (TDD). As the name implies, the DL and UL are separated in the time domain, typically using a guard period (GP) between them. The guard period serves several purposes. Most essentially, the processing circuitry at the BS and WD needs sufficient time to switch between transmission and reception. However, this is typically a fast procedure and does not significantly contribute to the requirement of the GP size. In addition, the GP should be sufficiently large to allow a WD to receive a (time-delayed) DL grant scheduling the UL and transmit the UL signal with proper timing advance (compensating for the propagation delay) such that the UL signal is received in the UL part of the frame at the BS. Thus, the GP should be larger than two times the propagation time towards a WD at the cell edge. Otherwise, the UL and DL signals in the cell will interfere. Because of this, the GP is typically chosen to depend on the cell size such that larger cells (i.e., cells with larger inter-site distances) have a larger GP and vice versa.

Additionally, the guard period may be used to reduce DL-to-UL interference between BSs by allowing a certain propagation delay between cells without having the DL transmission of a first BS enter the UL reception of a second BS. In a typical macro network, the DL transmission power can be on the order of 20 dB larger than the UL transmission power. Hence, if the UL is interfered by the DL of other cells, so called cross-link interference, the UL performance can be seriously degraded. Because of the large transmit power discrepancy between UL and DL, cross-link interference can be detrimental to system performance not only for the co-channel case (where DL interferes UL on the same carrier), but also for the adjacent channel case (where DL of one carrier interferes with UL on an adjacent carrier). Because of this, TDD macro networks are typically operated in a synchronized fashion where the symbol timing is aligned and a semi-static TDD UL/DL pattern is used which is the same for all the cells in the network (NW). Typically, operators with adjacent TDD carriers also synchronize their TDD UL/DL patterns to avoid adjacent channel cross-link interference.

The principle of applying a GP to avoid DL-to UL interference between BSs is shown in FIG. 2 where a victim BS (V) is being (at least potentially) interfered with by an aggressor BS (A). The aggressor BS is sending a DL signal to a device in its cell, but the DL signal also reaches the victim BS (the propagation loss is not enough to protect the victim BS from the signals of A). The signal is propagated a distance (d) and due to propagation delay, the experienced frame structure alignment of A at V is shifted/delayed $\tau$ seconds, proportional to the propagation distance d. As can be seen from FIG. 2, although the DL part of the aggressor BS (A) is delayed, the DL does not enter the UL region of the victim BS (V) due to the guard period used. The system design serves its purpose.

It could be noted that the terminology victim and aggressor is only used here to illustrate why typical TDD systems are designed as they are. The victim can also act as an aggressor and vice versa since channel reciprocity exists between the BSs.

Uplink-Downlink Configurations in TDD

In TDD, some subframes/slots are allocated for uplink transmissions and some subframes/slots are allocated for downlink transmissions. The switch between downlink and uplink occurs in the so called special subframes (LTE) or flexible slots (NR).

In LTE, seven different uplink-downlink configurations are provided, as shown in Table 1.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The size of the guard period (and hence the number of symbols for downlink pilot time slot (DwPTS) (downlink transmission in a special subframe) and uplink pilot time slot (UpPTS) (uplink transmission in a special subframe in the special subframe) can also be configured from a set of possible selections.

NR on the other hand provides many different uplink-downlink configurations. There are 10 to 320 slots per radio frame (where each radio frame has a duration of 10 ms) depending on subcarrier spacing. The OFDM symbols in a slot are classified as 'downlink' (denoted 'D'), 'flexible' (denoted 'X'), or 'uplink' (denoted 'U'). A semi-static TDD UL-DL configuration may be used where the TDD configuration is radio resource control (RRC) configured using the Information Element (IE) TDD-UL-DL-ConfigCommon:

```
TDD-UL-DL-ConfigCommon ::=           SEQUENCE {
    -- Reference SCS used to determine the time domain
boundaries in the UL-DL pattern which must be common
across all subcarrier specific
    -- virtual carriers, i.e., independent of the actual
subcarrier spacing using for data transmission.
    -- Only the values 15 or 30 kHz (<6GHz),
60 or 120 kHz (>6GHz) are applicable.
    -- Corresponds to L1 parameter 'reference-SCS'
(see 38.211, section FFS_Section)
      referenceSubcarrierSpacing           SubcarrierSpacing
      OPTIONAL,
    -- Periodicity of the DL-UL pattern. Corresponds to L1 parameter
'DL-UL-transmission-periodicity' (see 38.211, section FFS_Section)
      dl-UL-TransmissionPeriodicity        ENUMERATED {ms0p5, ms0p625,
ms1, ms1p25, ms2, ms2p5, ms5, ms10}      OPTIONAL,
    -- Number of consecutive full DL slots at the
beginning of each DL-UL pattern.
    -- Corresponds to L1 parameter 'number-of-DL-slots'
(see 38.211, Table 4.3.2-1)
      nrofDownlinkSlots                    INTEGER (0..maxNrofSlots)
      OPTIONAL,
    -- Number of consecutive DL symbols in the beginning of the slot
following the last full DL slot (as derived from nrofDownlinkSlots).
    -- If the field is absent or released, there is no partial-downlink slot.
    -- Corresponds to L1 parameter 'number-of-DL-symbols-
common' (see 38.211, section FFS_Section).
      nrofDownlinkSymbols                  INTEGER
(0..maxNrofSymbols-1)
           OPTIONAL, -- Need R
    -- Number of consecutive full UL slots at the end of each DL-UL pattern.
    -- Corresponds to L1 parameter 'number-of-UL-slots'
       (see 38.211, Table 4.3.2-1)
      nrofUplinkSlots                      INTEGER (0..maxNrofSlots)
           OPTIONAL,
```

-- Number of consecutive UL symbols in the end of the slot
preceding the first full UL slot (as derived from nrofUplinkSlots).
  -- If the field is absent or released, there is no partial-uplink slot.
  -- Corresponds to L1 parameter 'number-of-UL-symbols-
common' (see 38.211, section FFS_Section)
  nrofUplinkSymbols                   INTEGER (0..maxNrofSymbols-1)
  OPTIONAL -- Need R That is, a TDD periodicity of P ms is defined, and it can be arbitrarily specified how many DL and UL slots are fitted into this TDD periodicity, as well as the size of the GP. Additionally, it is possible to configure two concatenated periodicities $P_1$ and $P_2$, each with a separate number of DL/UL slots, so as to create a total TDD periodicity of $P_1+P_2$ ms.

In NR, the synchronization signal block (SSB) periodicity is fixed to the allowed values, 5, 10, 20, 40, 80 and 160 ms. Because the SSBs in initial access procedures have a default periodicity of 20 ms, all TDD periodicities should divide 20 ms evenly. For non-concatenated TDD periodicities, the value range for P is {0.5, 0.625, 1, 1.25, 2, 2.5, 3, 4, 5, 10} ms, which all except for the value of 3 ms divide 20 ms evenly. (The periodicity of 3 ms is not allowed to be selected for a non-concatenated TDD periodicity, but only as part of a concatenated TDD periodicity). For concatenated TDD periodicities, this puts constraint on which periodicities $P_1$ and $P_2$ that can be configured.

Alternatively, the slot format can be dynamically indicated with a Slot Format Indicator (SFI) conveyed with DCI Format 2_0. Regardless if dynamic or semi-static TDD configuration is used in NR, the number of UL and DL slots, as well as the guard period, that is, the number of UL and DL symbols in the flexible slot(s), may be almost arbitrarily configured within the TDD periodicity. This allows for very flexible uplink-downlink configurations.

Atmospheric Ducting

In certain weather conditions and in certain regions of the world a ducting phenomenon can happen in the atmosphere. The appearance of the duct is dependent on for example temperature and humidity and when it appears it can "channel" the signal to help it propagate a significantly longer distance than if the duct was not present. An atmospheric duct is a layer in which a rapid decrease in the refractivity of the lower atmosphere (the troposphere) occurs. In this way, atmospheric ducts can trap the propagating signals in the ducting layer, instead of radiating out in space. Thus, most of the signal energy propagates in ducting layer, which acts as a wave guide. Therefore, trapped signals can propagate through beyond-line-of-sight distances with relatively low path loss, sometimes even lower than in line-of-sight propagation. A ducting event is typically temporary and can have a time duration from a couple of minutes to several hours.

Combining the knowledge of the TDD system design and the presence of an atmospheric duct, the distance d in FIG. 2, where an aggressor BS can interfere with a victim BS, is greatly increased. Since the phenomenon is only appearing in certain parts of the world under certain conditions, this has typically not been considered in designs of cellular systems using unpaired spectrum. The implication is that a DL transmission can suddenly enter the UL region as interference (I), which is illustrated in FIG. 3.

The figure illustrates a single radio link, but when the atmospheric ducting occurs, a BS can be interfered with by thousands of BSs. The closer the aggressor the shorter the propagation delay, and the stronger the interference. Hence, the interference experienced at the victim typically has a slope characteristic, as illustrated in FIG. 4.

It should be noted that although the interference problem is described to stem from atmospheric ducting, the same situation could occur in a network where a too small guard period has been selected for the deployment. Hence, solutions provided herein are also applicable to this case, although not considered a typical scenario.

One way to detect interference between BSs is for the victim (i.e., a BS that has detected that it is being interfered with due to atmospheric ducting) to send a specific reference signal that can be detected by an aggressor. The aggressor can in this case adapt its transmission to avoid the interference situation. One such adaptation is for the aggressor to blank its downlink transmission, effectively increasing the guard period.

It can be noted that due to channel reciprocity, it is likely that an aggressor is also the victim of other BSs transmission as well. FIG. 5 illustrates radio interference mitigation reference signal (RIM-RS) transmission.

3GPP RIM Frameworks

TD-LTE RIM Framework

In some known solutions, the RIM framework in FIG. 6 has been used to cope with the remote interference.

As shown in FIG. 6, the TD-LTE RIM framework is not self-adaptive. The stop of RIM-RS transmission, the triggering and stop of RIM-RS monitoring, the triggering and stop of applications of the remote interference mitigation solutions are all rely on manual intervention through OAM. In this framework, the start and stop of the RIM and corresponding remote interference mitigation schemes cannot happen in a timely manner, thus causing degradation of both network performance and efficiency.

NR RIM Frameworks

In order to minimize or eliminate manual intervention during the RIM process, and increase the effectiveness and efficiency of the RIM, adaptive frameworks for enabling coordination between the nodes involved in the remote interference (RI) scenario were studied for 3GPP Rel-16 NR RIM study item. The outcome of the study item has been documented in 3GPP Technical Report (TR) 38.886.

The coordination between the victim and aggressor gNBs can be done either by a combination of over-the-air (OTA) and backhaul messaging, or by OTA messaging only. Therefore, besides the LTE-like centralized RIM framework (Framework-0 in 3GPP Technical Standard (TS) 38.886), two adaptive RIM frameworks were considered by the 3GPP:

A framework solely relying on over-the-air (OTA) signaling (Framework-1 in 3GPP TR 38.866);

A framework combining over-the-air and backhaul signaling (Framework-2.1 in 3GPP TR 38.866).

The frameworks that have been agreed upon for NR are described below:

Framework 0 (FIG. 7)
Workflow of Framework-0;
Step 0: Atmospheric ducting phenomenon happens, and the remote interference appears;
Step 1:
Victim experiences "sloping" like Interference over Thermal noise (IoT) increase and starts RS transmission;
Aggressor starts monitoring RS as configured by operations, administration and maintenance (OAM);
Step 2: Upon reception of RS, Aggressor reports the detected RS to OAM;
Step 3: OAM sends remote interference mitigation scheme to Aggressor;
Step 4: Aggressor applies remote interference mitigation scheme;
Step 5: OAM stops RS monitoring and restores original configuration at aggressor side and stop RS transmission at victim side when the ducting stops.

Framework 1 (FIG. 8)
Workflow of Framework-1 is described as follows:
Step 0: Atmospheric ducting phenomenon happens, and the remote interference appears;
Step 1:
Victim experiences "sloping" like Interference over Thermal noise (IoT) increase and start RS transmission/monitoring;
This RS marked as RS-1 is used to assist aggressor(s) to recognize that they are causing remote interference to the victim and to detect/deduce how many UL resources of the victim are impacted by the aggressors;
Aggressor starts monitoring RS as configured by OAM or when the aggressor experiences remote interference with "sloping" IoT increase;
Step 2: Upon reception of RS-1, Aggressor starts remote interference mitigation solutions such as muting some DL transmission symbols and transmits RS to inform victim that the atmospheric ducting phenomenon still exists;
This RS marked as RS-2 is used to assist the victim to decide whether the atmospheric ducting phenomenon still exists;
It does not preclude the possibility of using RS-2 for other purposes, pending on further study;
Step 3: Victim continues RS-1 transmission if RS-2 is detected. Victim may stop RS-1 transmission if RS-2 is not detected and the IoT going back to certain level;
Step 4: Aggressor continue remote interference mitigation while receiving RS-1. Upon "disappearance" of RS-1, Aggressor restores original configuration.
Note: Although RS-1 and RS-2 carry different functionalities, it might be beneficial to achieve a common design for RS-1 and RS-2.

Framework 2.1 (FIG. 9)
Workflow of Framework-2.1:
Step 0: Atmospheric ducting phenomenon happens, and the remote interference appears;
Step 1:
Victim experiences "sloping" like IoT increase and start RS transmission;
A set of gNBs might use the same RS, which may carry the set ID;
Aggressor starts monitoring RS as configured by OAM or when the aggressor experiences remote interference with "sloping" IoT increase;

Step 2: Upon reception of RS, Aggressor informs the set of victim gNB(s) the reception of RS through backhaul and apply interference mitigation scheme;
Message exchange in Step 2 could include other information, pending on further study;
Step 3: Upon "disappearance" of RS, Aggressor informs the set of Victim gNB(s) the "disappearance" of RS through backhaul and restore original configuration;
Step 4: Victim stop RS transmission upon the reception of the "disappearance of RS" info through backhaul.

3GPP RIM RS Functionality

From the above descriptions, in all the NR RIM frameworks, RIM RSs should be sent, and the functionalities of the RIM RSs are summarized below in Table 2:

TABLE 2

| Framework | RS type | Functions |
| --- | --- | --- |
| Framework 0 | RS sent by victim (RS-1) | 1/ Being able to provide information whether the atmospheric ducting phenomenon exists<br>2/ Being able to assist the aggressor to identify how many UL OFDM symbols at victim it impacted. |
| Framework 1 | RS-1 sent by victim | 1/ Being able to provide information whether the atmospheric ducting phenomenon exists<br>2/ Being able to assist the aggressor to identify how many UL OFDM symbols at victim it impacted. |
| | RS-2 sent by aggressor | 1/ Being able to provide information whether the atmospheric ducting phenomenon exists |
| Framework 2.1 | RS sent by victim (RS-1) | 1/ Being able to assist the aggressor to identify many UL OFDM symbols at victim it how impacted.<br>2/ Being able to carry enough information to enable the information exchange through backhaul (e.g.: set ID). |

The above RIM RSs can be designed in a unified way in terms of sequence type, time and frequency transmission pattern, regardless of which framework is chosen, to convey information for gNB (or gNB set) identification. It should be noted that the initial step in victim-aggressor communication, e.g., RIM RS-1 transmission, may be executed over the air (OTA) regardless of which RIM framework is used, to enable identification of the victim (set) by an aggressor (set). For the adaptive frameworks, e.g., framework-1 and framework-2.1, after the aggressor (set) has identified the gNB/gNB-set ID from the RS-1 received and identified the victim (set), the coordination may proceed OTA (via RS-2) or over the backhaul.

At the same time, a victim gNB/gNB-set can also use RIM RS-1 to convey information, e.g., either "Enough mitigation, no further actions needed" or "Not enough mitigation, further actions needed".

3GPP RIM RS Configuration

To convey the gNB/gNB-set ID information, the RIM RS transmission resources should be distinguishable. The following methods are supported to distinguish RIM-RS resources:

Time division multiplexing (TDM) method: different time-domain occasions are used to distinguish RIM-RS resources;
Frequency division multiplexing (FDM) method: different frequency positions are used to distinguish RIM-RS resources;
Code division multiplexing (CDM) method: different RS sequences are used to distinguish RIM-RS resources.

Therefore, in NR, a basic RIM-RS resource is defined as the time resource, the frequency resource and the sequence ID used for a RIM-RS transmission, and each basic RIM-RS resource is uniquely indexed. All configured basic RIM-RS resources have the same bandwidth and the same subcarrier spacing.

A network node, e.g., gNB, can be configured with multiple set IDs. For each set ID, a gNB can be configured to associate to one or multiple RIM-RS resources. The mapping of a set ID to multiple RIM-RS resources is supported for two main use cases:

Repetition of the RIM-RS transmission to improve RS detection performance and coverage enhancement (repetition functionality). An example is illustrated in FIG. 10, where the basic RS resource is placed in the same position relative to the "1st reference point" and the gNB can perform either combination of the received RIM-RS across the two DL-UL switching periods, or, perform multi-shot detection, in order to improve detection performance;

Different RS symbol placement relative to the "1st reference point" in different DL-UL switching periods in order to account for different propagation delay ranges (near/far functionality). An example is illustrated in FIG. 11, where in the first DL-UL switching period, the RIM RS resource is placed right before the 1st reference point, enabling the signal to propagate up to 210 km without falling into the DL part of a receiver gNB, while in the second DL-UL switching period, the RIM RS resource is placed in the slot prior to the DL-UL switching point enabling the signal to fall in to the UL symbols of receiving gNBs with a propagation distance 210-390 km away from the transmitter.

Regarding the time-domain pattern for RIM RS, a global RIM-RS transmission periodicity is defined. The transmission periodicity can be semi-statically configured per network and the periodicity is based on all required RIM RS-1 resources and all required RIM RS-2 resources. The global RIM-RS transmission periodicity is a multiple of the periodicity of the TDD DL/UL pattern if only one TDD pattern is configured, or multiple of the combined periodicity if two TDD DL/UL patterns are configured.

Reference Signal Sequences in LTE and NR

In mobile radio systems like LTE and NR, a reference signal (RS) is typically transmitted to aid radio channel knowledge but can also be transmitted for tracking impairments induced by a local oscillator of a transceiver. The design of a reference signal may depend on its use and several types of reference signals are used in a mobile radio system. A purpose of a reference signal will often be reflected by its name. For example, a reference signal designed and used for coherent demodulation of a physical layer channel is referred to as demodulation reference signal (DMRS), a reference signal designed and used for acquiring channel state information in downlink is referred to as a channel state information reference signal (CSI-RS), a reference signal designed for remote interference management is denoted remote interference mitigation reference signal (RIM-RS) and a reference signal designed for tracking of time and frequency differences between transmitter and receiver is referred to as a tracking reference signal (TRS).

With NR, a resource specific design has been adopted for DMRS, CSI-RS, RIM-RS and TRS, which means that the RS should be indexed by the subcarrier relative to a global reference point, rather than being indexed relative to the allocation of the associated data transmission.

A principle in cellular networks is that interference between reference signals transmitted from different transmission points (TRPs) or cells, should be mutually randomized. This means that the correlation between two unique sequences should be low. This means that the interference experienced by a receiver from reference signals transmitted from other TRPs should behave as noise. In NR, for the cyclic prefix (CP)-OFDM waveform, the design of the RIM-RS may be based on pseudo-random binary sequences (PRBS) derived from Gold sequences. The desirable noise behavior is then achieved by assigning different PRBS seeds to different transmission points, and to make the PBRS seeds be a function of time.

The DL reference signal sequence definition from LTE looks like this:

$$r(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots$$

where the pseudo-random sequence c(i) is a Gold-31 sequence, where the initial state of the pseudo-random sequence generator will depend on the type of reference signal.

In the case of a common reference signal (CRS), the pseudo-random sequence generator may be initialized with $$c_{init} = 2^{10} \cdot (7 \cdot (n_s+1) + l + 1) \cdot (2 \cdot N_{ID}^{cell} + 1) + 2 \cdot N_{ID}^{cell} + N_{CP}$$

where $n_s$ is the slot number within a radio frame and l is the OFDM symbol number within the subframe, $N_{ID}^{cell}$ is the physical cell ID and $N_{CP}$ is a bit that depends on the type of CP. Hence, the initial states of the pseudo-random generator will depend on the OFDM symbol within the radio frame, and the physical cell ID will ensure that cells get different cell specific reference signals (CRS) sequences.

The pseudo random sequence generator for New Radio (NR) is defined in section 5.2.1 of Technical Standard (TS) 38.211 developed by the Third Generation Partnership Project (3GPP).

In cases using channel state information reference signals (CSI-RS), the pseudo-random sequence generator is initialized with $$c_{init} = 2^{10} \cdot (7 \cdot (n'_s+1) + l + 1) \cdot (2 \cdot N_{ID}^{CSI} + 1) + 2 \cdot N_{ID}^{CSI} + N_{CP}$$

at the start of each OFDM symbol. The quantity $N_{ID}^{CSI}$ equals $N_{ID}^{cell}$ unless configured by higher layers.

In NR, the hard-coded dependency to the physical cell-ID, as in the case of CRS, is to be removed. Instead an identifier configured per WD for each RS will be used, like the CSI-RS initialization above. The number of physical cell IDs is increased from the 504 in LTE to 1008 in NR and depending on numerology, the number of slots within a radio frame can be up to 320 in NR, to be compared with 20 slots in LTE. The number of configurable identifiers can be much larger than the number of physical cell IDs.

In NR $c_{init}$ for demodulation reference signals (DMRS) is defined, for example, in section 7.4.1.1.1 of 3GPP TS 38.211. $c_{init}$ for CSI-RS is defined, for example, in section 7.4.1.5.2 of 3GPP TS 38.211, V15.4.0.

In summary, the sequence initialization for LTE CRS/DMRS and NR TRS/CSI-RS/DMRS all have the following basic structure $$c_{init} = \mod(2^A \cdot t \cdot N_{ID} + 2^B \cdot N_{ID}, 2^{31}),$$

where t is a time dependent parameter (symbol counter), and $N_{ID}$ is a parameter that may be WD specific, or cell specific, and is used to configure the desired sequence.

The problem of reusing the PRBS initialization of LTE CRS (or NR CSI-RS and NR DMRS which have the same basic structure) for RIM-RS in NR is that this initialization is designed to ensure that, over time, any distinct pair of $N_{ID}$ yields sequences having the same (beneficial) mutual correlation. This design is on purpose to simplify cell-planning, and reference signal resource management.

In the case of RIM-RS the number of unique sequences needed is significantly smaller, only 8 (as compared to, e.g., $2^{10}$ in NR CSI-RS). This enables careful selection of sequences that have extraordinarily beneficial cross correlation properties. This calls for a different structure of the initializer.

SUMMARY

In accordance with one embodiment, a network node configured to communicate with a wireless device is provided in which the network node is configured to generate an initialization seed computed by linearly combining a function of a time counter t and a function of a scrambling identifier, $N_{ID}$, and generate a radio interference mitigation reference signal, RIM-RS, sequence based at least in part on the initialization seed.

In accordance with an aspect of this embodiment, the initialization seed fits into a 31-bit linear feedback sequence register associated with a length 31 Gold sequence generator. In accordance with another aspect of this embodiment, the time counter t counts RIM-RS transmission occasions. In accordance with another aspect of this embodiment, the function of the time counter t is based on a parameter chosen to maximize a number of unique RIM-RS sequences. In accordance with another aspect of this embodiment, the function of the time counter t is based on a parameter chosen to shift the initialization seed. In accordance with still another aspect of this embodiment, the parameter chosen to shift the initialization seed is a prime number. In accordance with another aspect of this embodiment, the linear combining is modulo 2. In accordance with yet another aspect of this embodiment, the initialization seed computed by linear combining is linearly combined such that bits dependent on t and bits dependent on $N_{ID}$ are placed on separate parts of a bit field of the initialization seed. In accordance with another aspect of this embodiment, the network node is further optionally configured to transmit, based on or using the generated RIM-RS sequence, a RIM-RS for reception by another network node.

Another embodiment provides a method implemented in a network node, in which the method includes generating an initialization seed computed by linearly combining a function of a time counter t and a function of a scrambling identifier, $N_{ID}$, and generating a radio interference mitigation reference signal, RIM-RS, sequence based at least in part on the initialization seed.

In accordance with an aspect of this embodiment, the initialization seed fits into a 31-bit linear feedback sequence register associated with a length 31 Gold sequence generator. In accordance with another aspect of this embodiment, the time counter t counts RIM-RS transmission occasions. In accordance with another aspect of this embodiment, the function of the time counter t is based on a parameter chosen to maximize a number of unique RIM-RS sequences. In accordance with another aspect of this embodiment, the function of the time counter t is based on a parameter chosen to shift the initialization seed. In accordance with still another aspect of this embodiment, the parameter chosen to shift the initialization seed is a prime number. In accordance with another aspect of this embodiment, the linear combining is modulo 2. In accordance with yet another aspect of this embodiment, the initialization seed computed by linear combining is linearly combined such that bits dependent on t and bits dependent on $N_{ID}$ are placed on separate parts of a bit field of the initialization seed. In accordance with another aspect of this embodiment, the method includes optionally transmitting, based on or using the generated RIM-RS sequence, a RIM-RS for reception by another network node.

Some examples advantageously provide methods and network nodes for generating a radio interference mitigation reference signal (RIM-RS) sequence.

According to one embodiment, a symbol counter and identifier are given separate segments of:

$$c_{init}=2^A \cdot \mathrm{mod}(t \cdot Z, 2^C)+2^B \cdot N_{ID},$$

where Z may be a prime number, and A, B and C are constants selected to place the bits dependent on t, and those dependent on $N_{ID}$, on separate parts of the $c_{init}$ bit field.

The PRBS initialization value, $c_{init}$, may fit into the 31-bit linear feedback sequence register associated with the length-31 Gold sequence generator, that is $\lceil \log_2 \max(c_{init}) \rceil \leq 31$.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
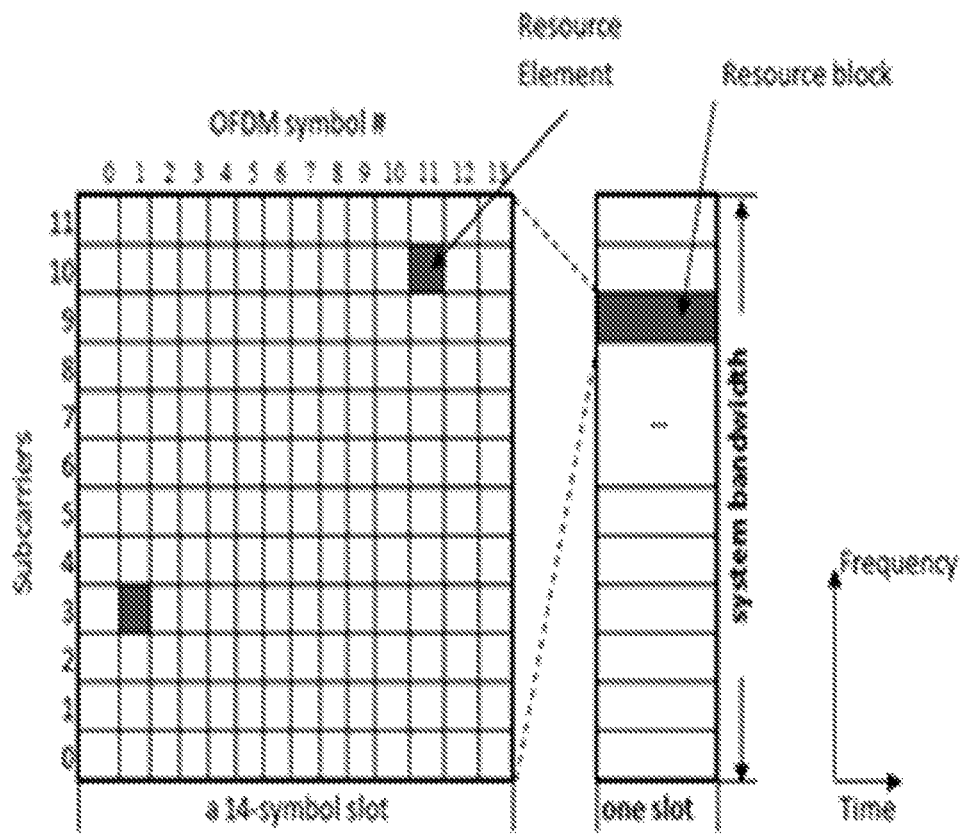
FIG. 1 illustrates a New Radio (NR) physical resource grid.
Figure 2:
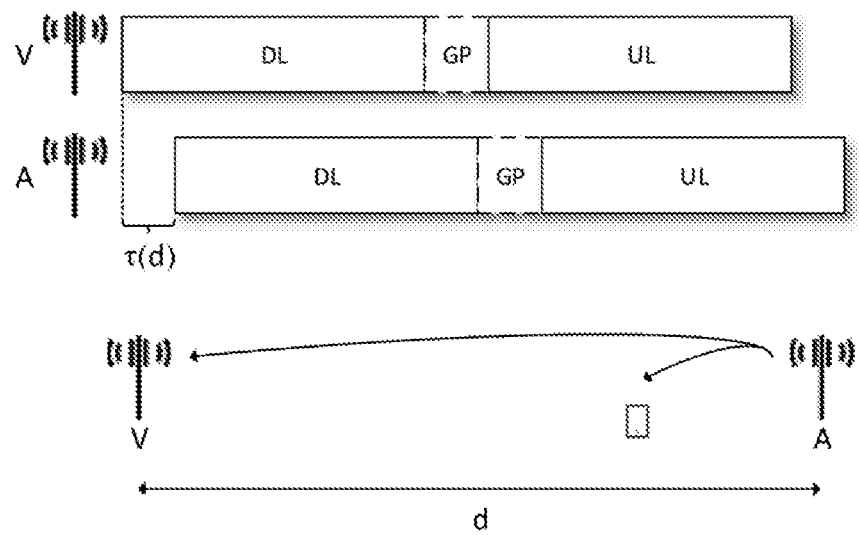
FIG. 2 illustrates a time division duplex (TDD) guard period design.
Figure 3:
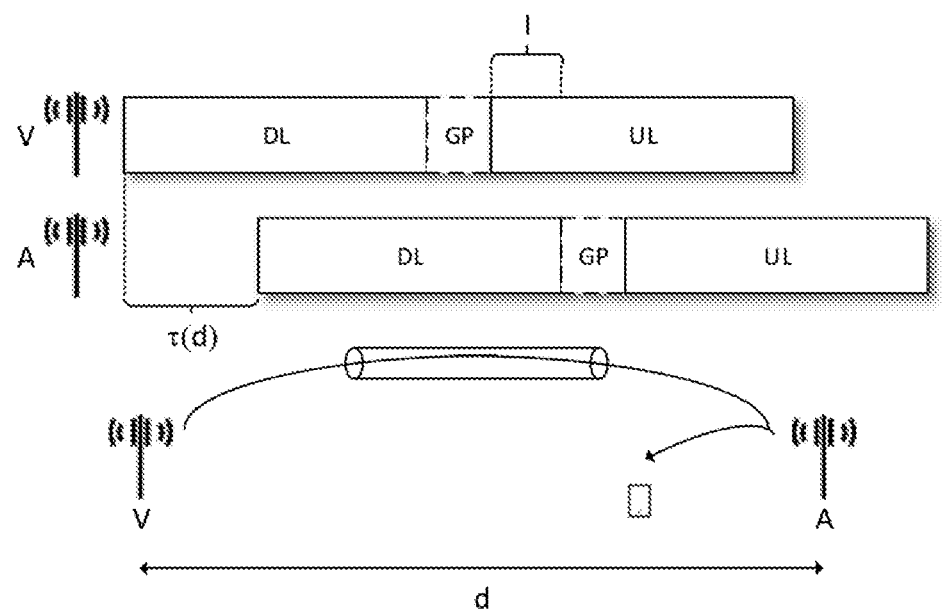
FIG. 3 illustrates downlink (DL) interference into an uplink (UL) region.
Figure 4:
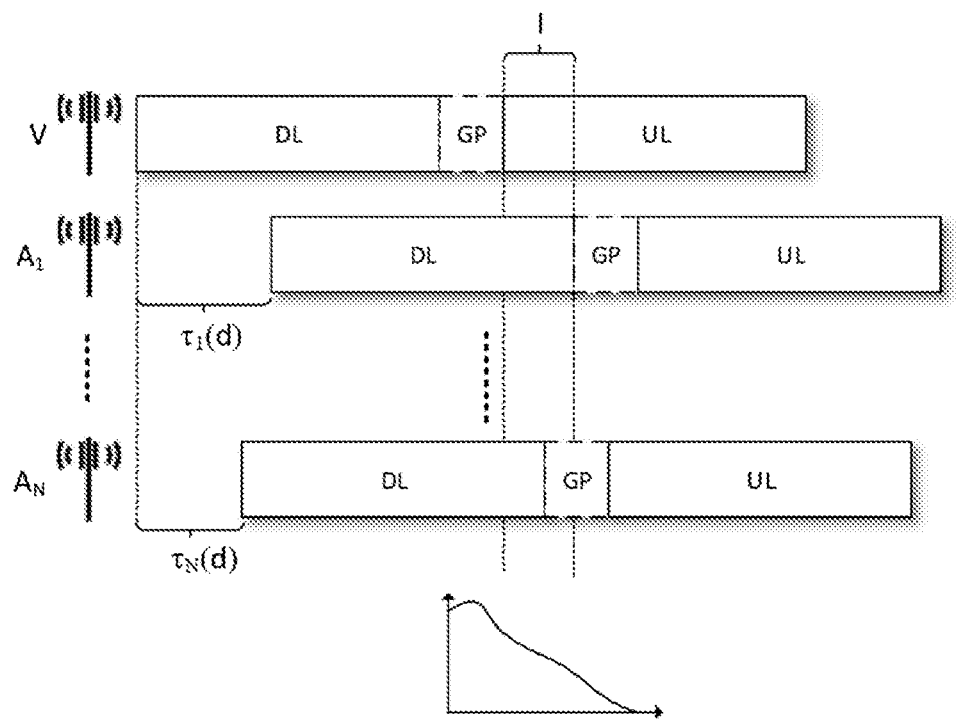
FIG. 4 illustrates interference characteristics in case of DL to UL interference.
Figure 5:
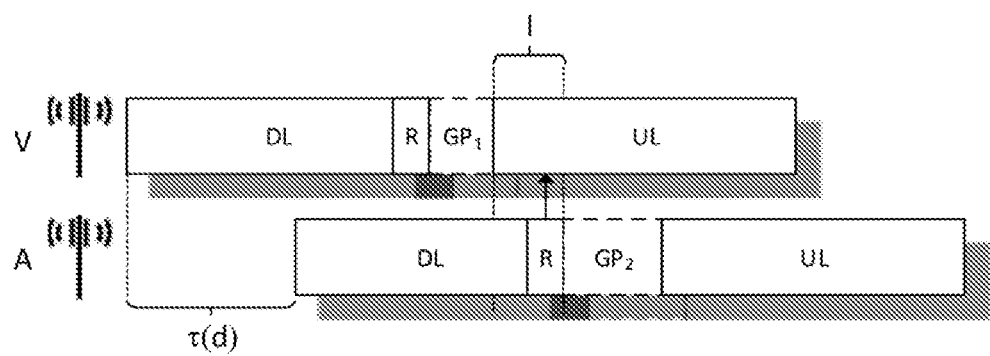
FIG. 5 illustrates RIM-RS transmission.
Figure 6:
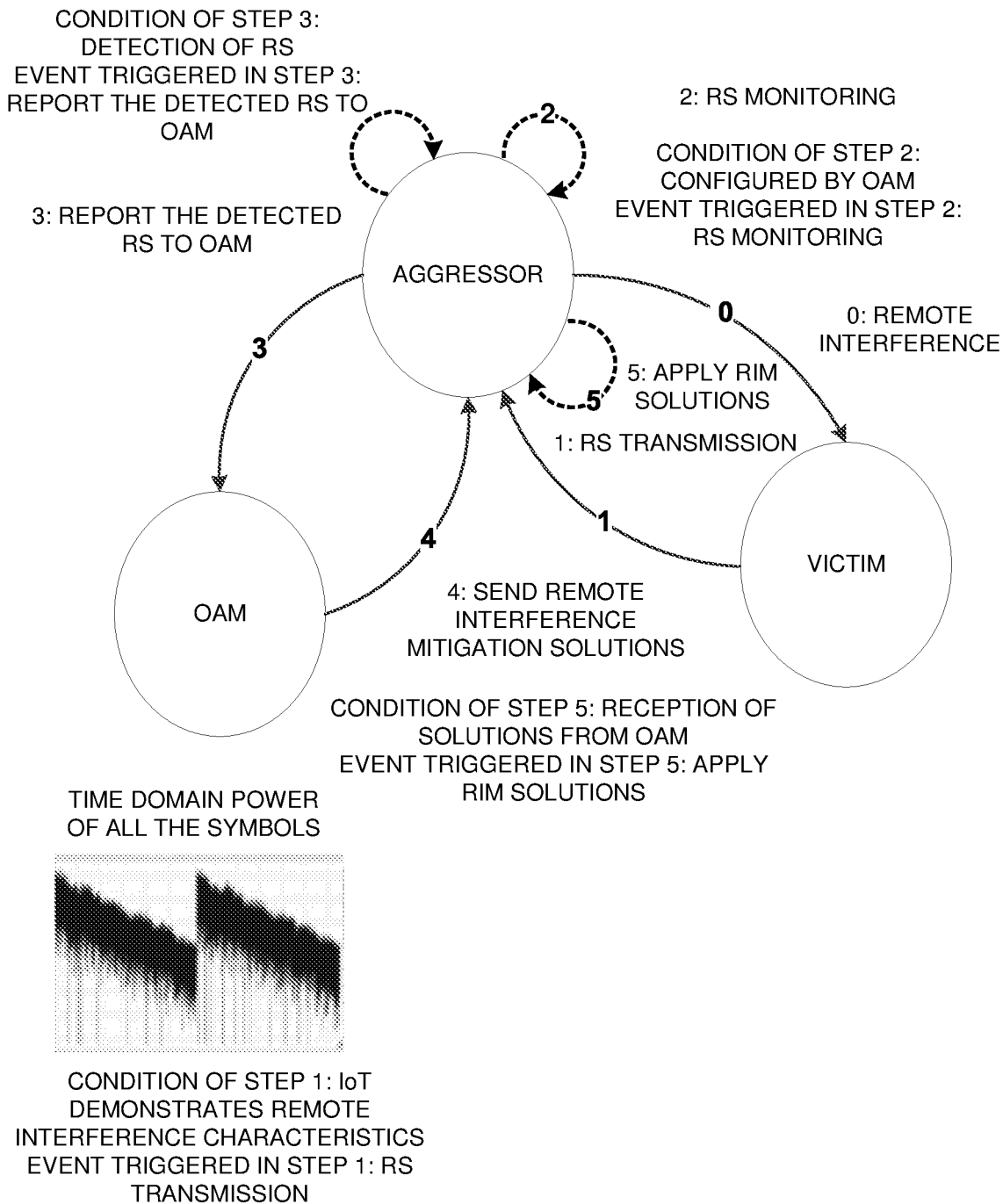
FIG. 6 illustrates a TD-LTE RIM framework.
Figure 7:
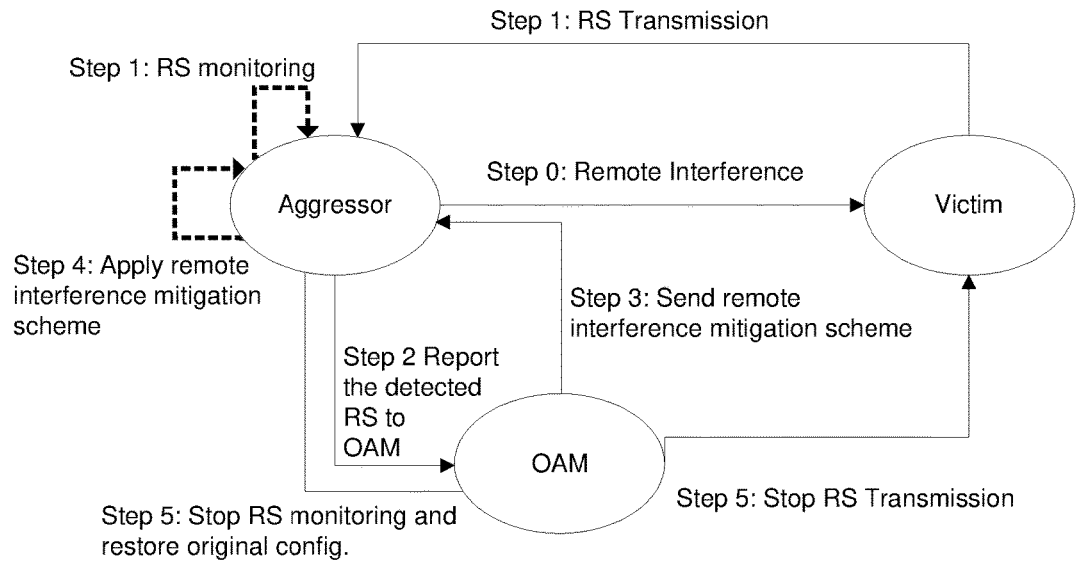
FIG. 7 illustrates RIM framework (RIM Framework 0)
Figure 8:
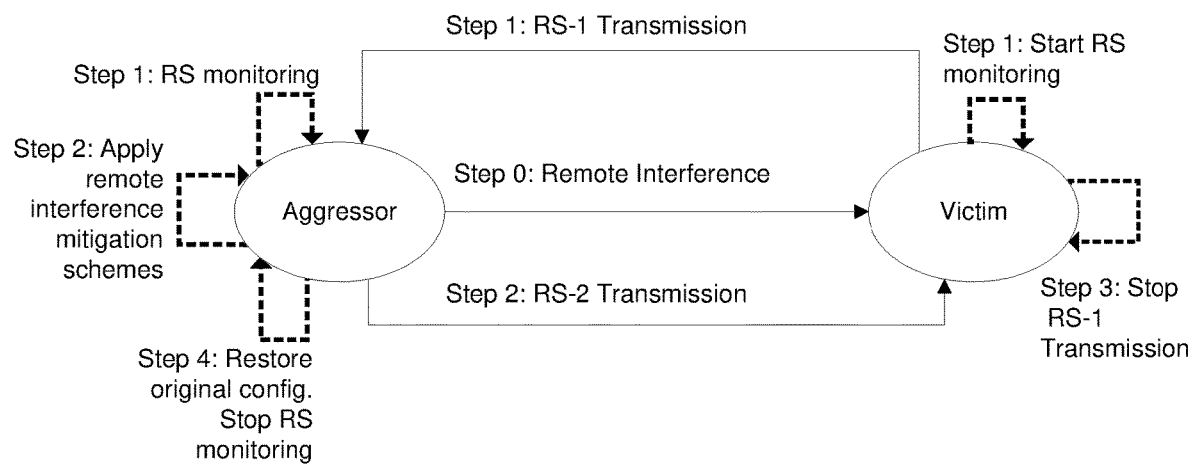
FIG. 8 illustrates adaptive RIM framework (RIM Framework 1)
Figure 9:
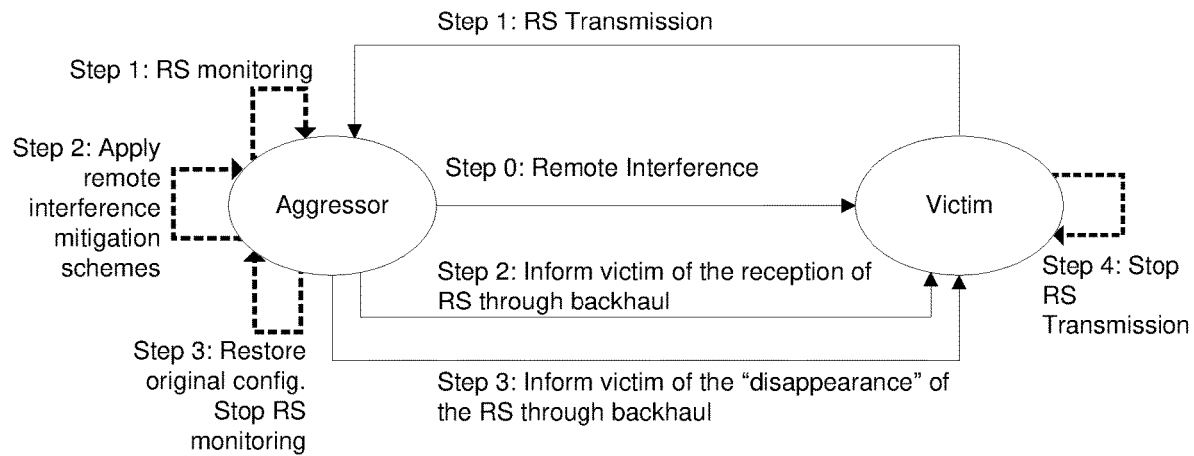
FIG. 9 illustrates adaptive RIM framework (RIM Framework 2.1)
Figure 10:
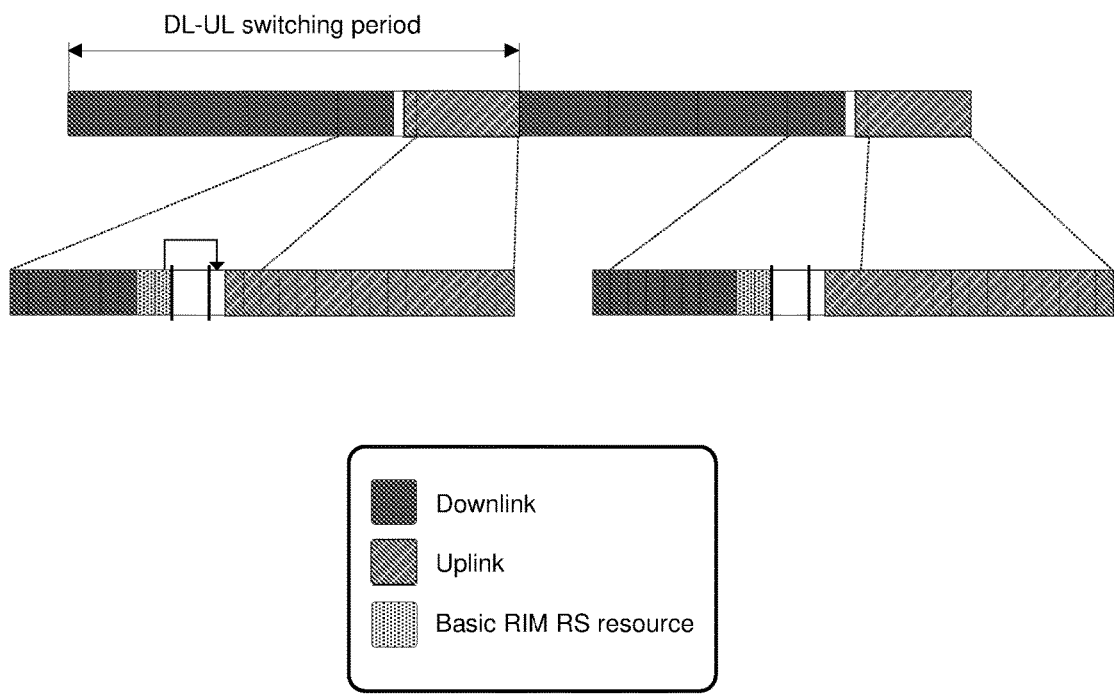
FIG. 10 illustrates a first use case for mapping of a set ID to multiple RIM-RS resources.
Figure 11:
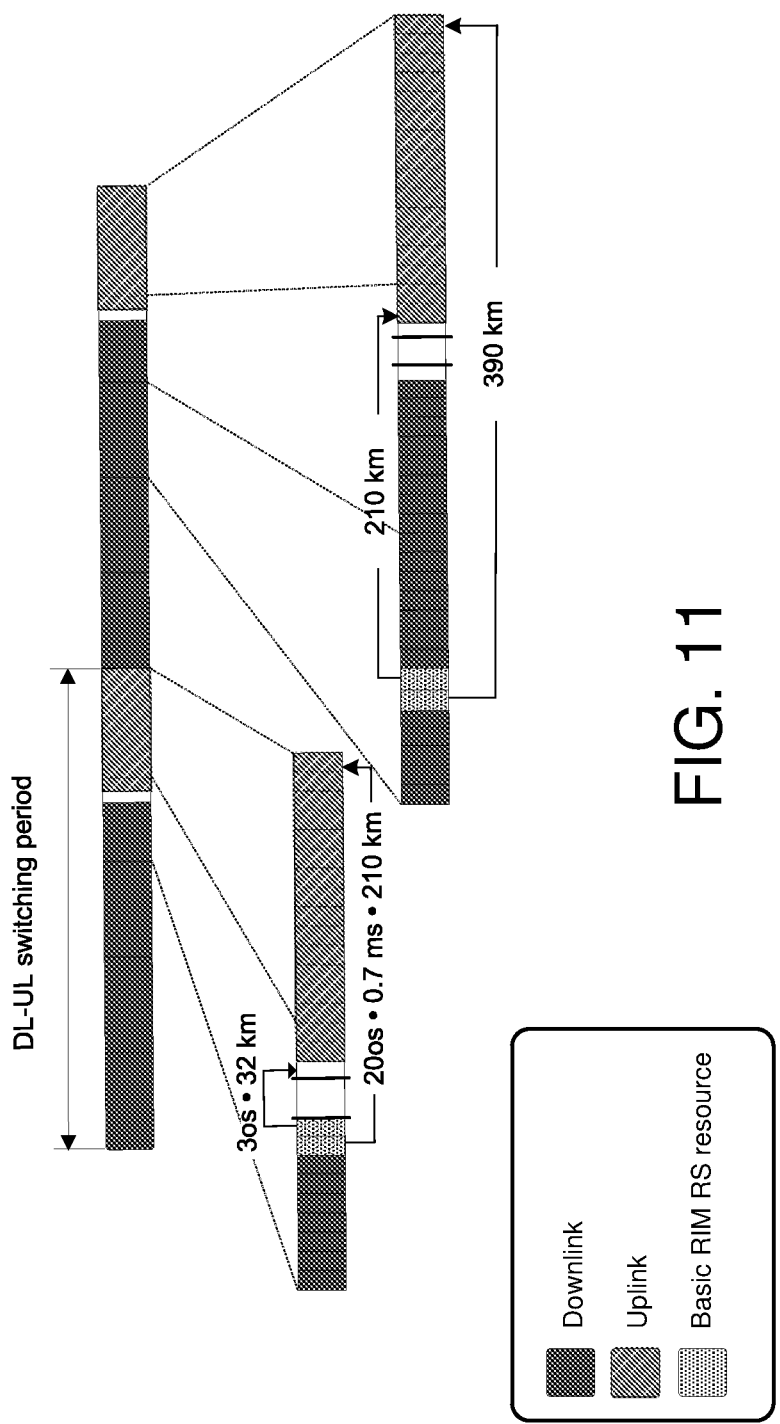
FIG. 11 illustrates a second use case for mapping of a set ID to multiple RIM-RS resources.

Before describing in detail exemplary embodiments, it is noted that the embodiments reside primarily in combinations of apparatus components and processing steps related to generating a radio interference mitigation reference signal (RIM-RS) sequences. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, Minimization of Drive Tests (MDT) node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipment (LEE), laptop mounted equipment (LME), Universal Serial Bus (USB) dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU), Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments may provide at least one of three benefits over the legacy structures described above.

Some embodiments ensure that, if a pair of scrambling identifiers $N_{ID}$ with good mutual correlation properties is found for a given t, the correlation properties will be good for any t, where, as noted above, $N_{ID}$ is a parameter that is used to configure the desired sequence;

It allows a large set of possible $N_{ID}$—hence ensuring that a set of $N_{ID}$ with good mutual correlation properties exist;

The dependence on Z (which can be configured to the transmitter directly over a wired interface and thus not over the air) makes it hard for a jammer to create an interfering signal by, e.g., just repeating a previously received RIM-RS, or by processing as long as Z cannot be identified.

Figure 12:
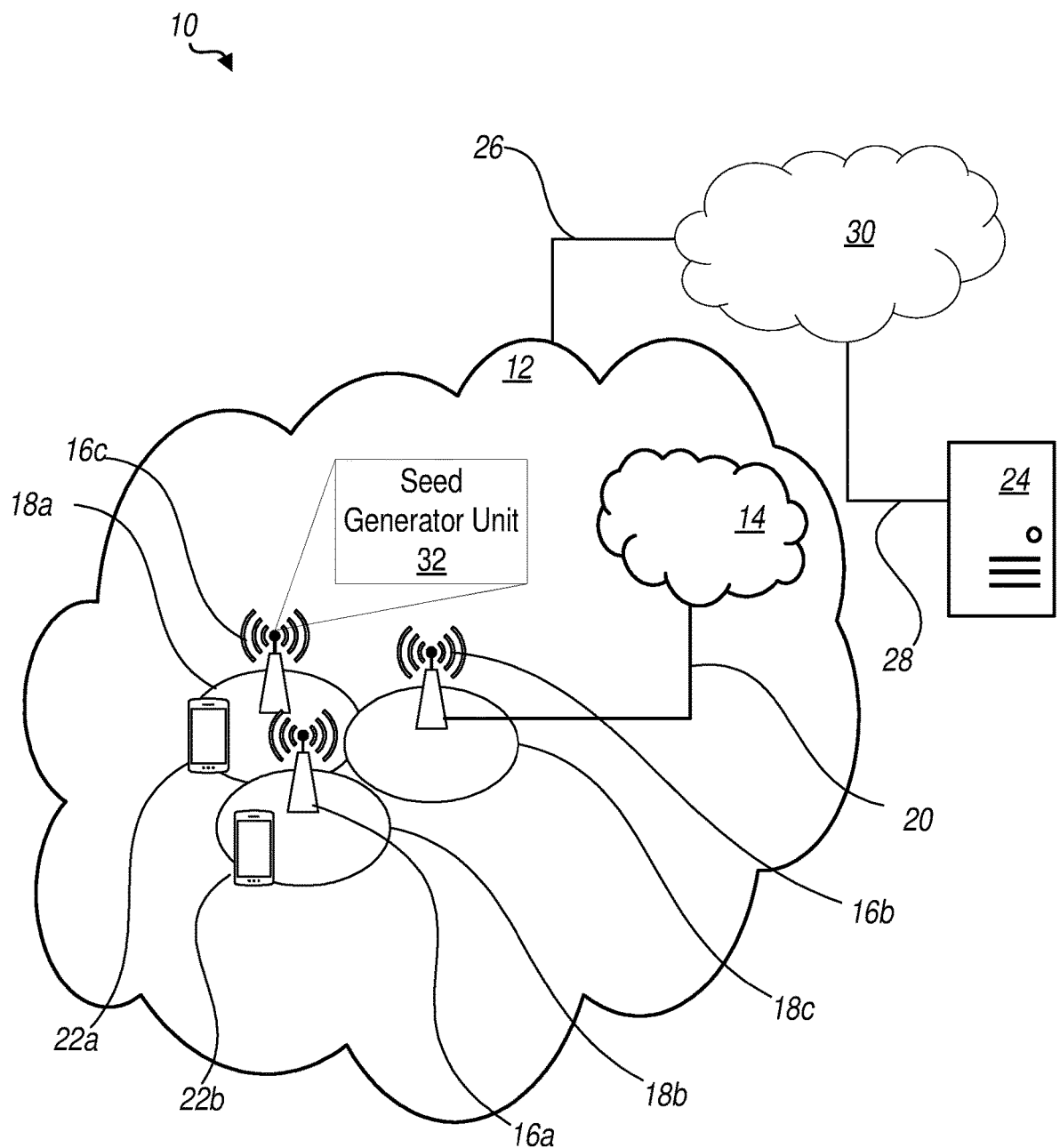
FIG. 12 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 12 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 12 as a whole enables connectivity between any one or more of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a seed generator unit 32 which may be configured to generate an initialization seed computed by linearly combining, modulo 2, a function of only a time counter t and a function of only a scrambling identifier, $N_{ID}$. It is noted that the term "only" as used in this context refers to cases where a function only dependent on a time counter t means that the function is dependent on the time counter t but not on the scrambling identifier MD, and that a function only dependent on a scrambling identifier MD means that the function is dependent on the scrambling identifier MD but not on the time counter t. The network node 16 is further configured to include an RIM-RS generator unit 76 which is configured to generate a radio interference mitigation, RIM, reference signal, RS, based at least in part on the initialization seed.

Example implementations, in accordance with an embodiment, of the WD 22, network node 16 and host computer 24 discussed in the preceding paragraphs will now be described with reference to FIG. 13. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 may include one or more processors 44 for performing host computer 24 functions described herein. The host computer 24 includes memory 46 that is configured to store data, programmatic software code and/or other information described herein. In some embodiments, software 48 and/or host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 that may include hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70, such as a central processing unit, and a memory 72. In particular the processing circuitry 68 may comprise, in addition to or instead of processor and memory, integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 may include one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include seed generator unit 32 which is configured to generate an initialization seed computed by linearly combining a function of a time counter t and a function of a scrambling identifier, $N_{ID}$. The network node 16 is further configured to include an RIM-RS generator unit 76 which is configured to generate a radio interference mitigation reference signal RIM-RS, sequence based at least in part on the initialization seed.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86, such as a central processing unit, and memory 88. In particular the processing circuitry 84 may comprise, in addition to or instead of processor and memory, integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 may include one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 13:
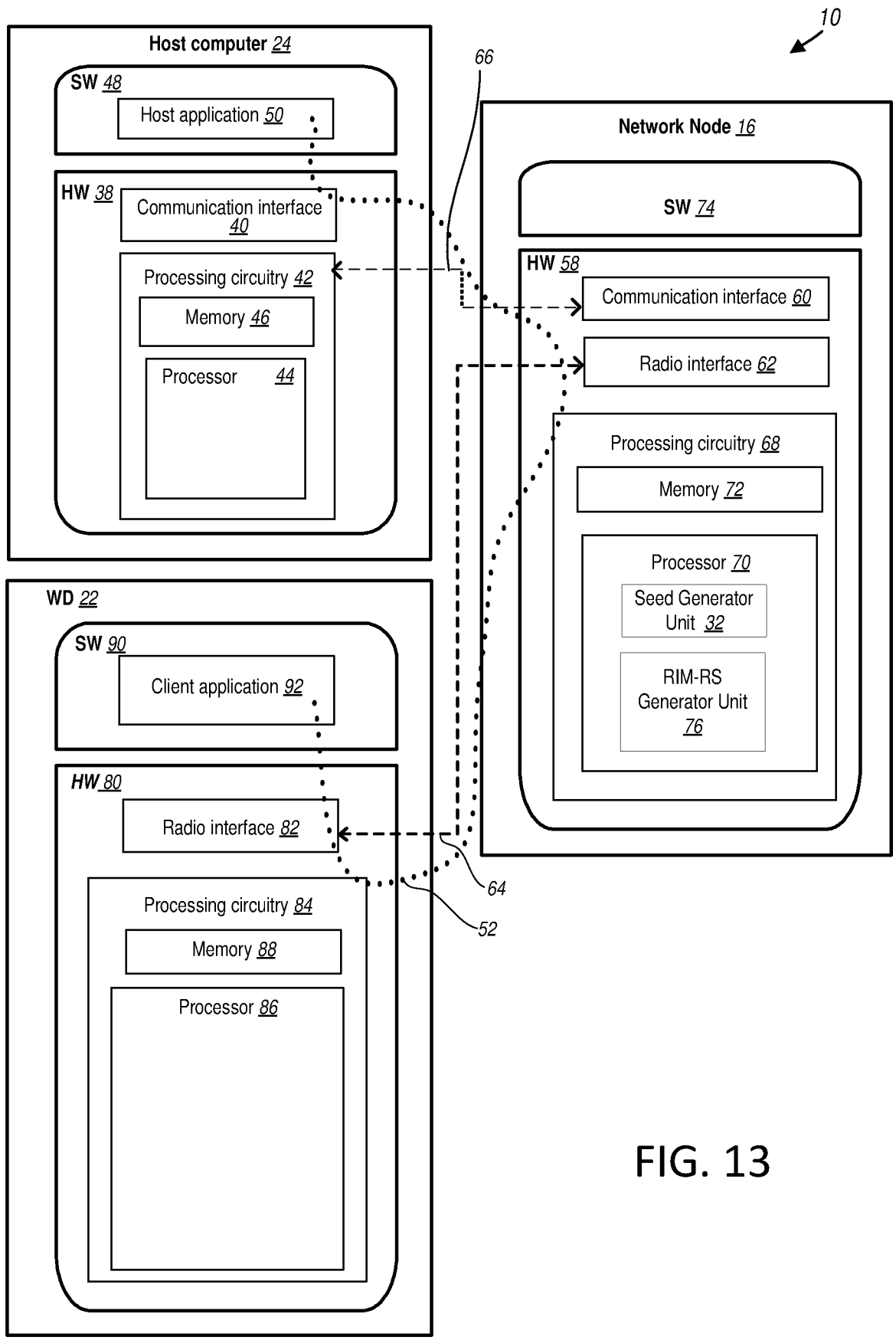
FIG. 13 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 13 and independently, the surrounding network topology may be that of FIG. 12.

In FIG. 13, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing, etc. The reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in reception of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in reception of a transmission from the network node 16.

Although FIGS. 12 and 13 show various "units" such as seed generator unit 32, and RIM-RS generator unit 76 as being within a processor, it is contemplated that these units may be implemented such that a portion of the unit is stored in a corresponding memory within the processing circuitry. In other words, the units may be implemented in hardware or in a combination of hardware and software within the processing circuitry.

Figures 14, 15:
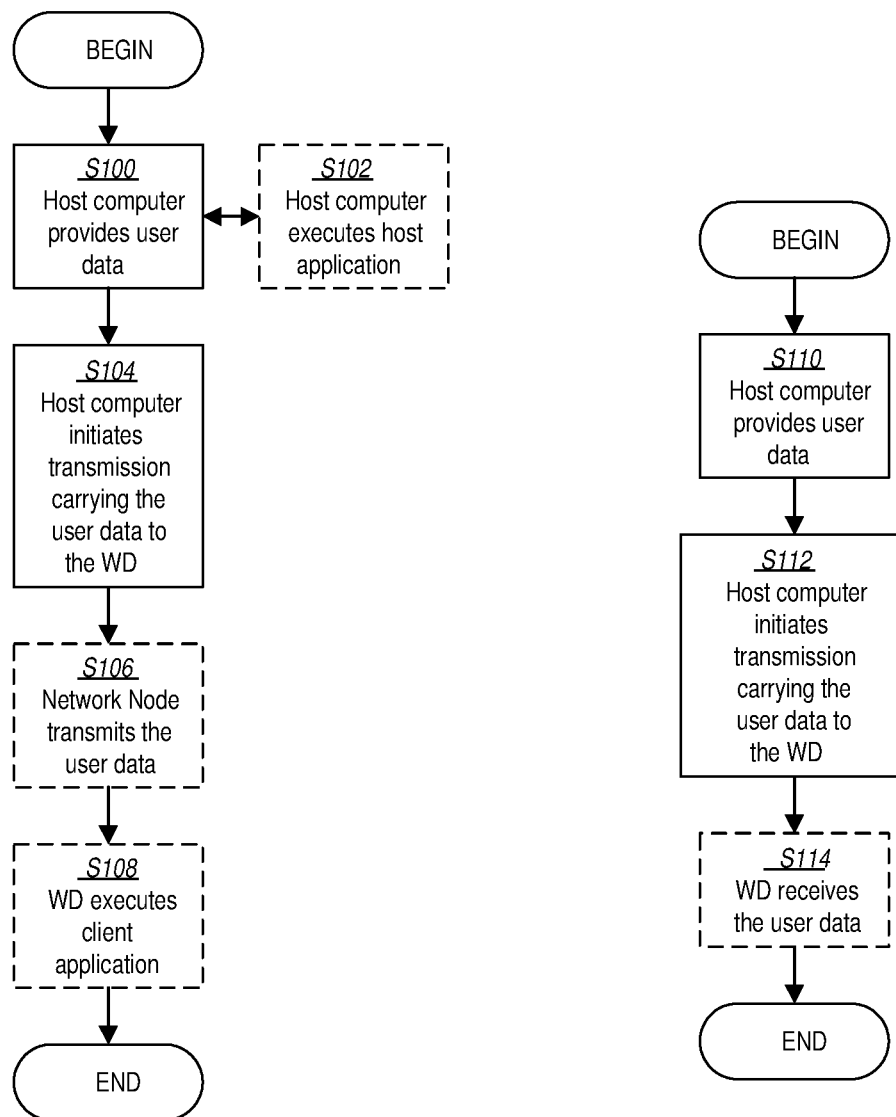
FIG. 14 is a flowchart illustrating exemplary methods implemented in a communication system including a host computer, a network node and a wireless device for executing a client application at a wireless device according to some embodiments of the present disclosure.
FIG. 15 is a flowchart illustrating exemplary methods implemented in a communication system including a host computer, a network node and a wireless device for receiving user data at a wireless device according to some embodiments of the present disclosure.

FIG. 14 is a flowchart illustrating an exemplary method implemented in a communication system, such as, for example, the communication system of FIGS. 12 and 13, in accordance with one embodiment. The communication system may include a host computer 24, a network node 16 and a WD 22, which may be those described with reference to FIG. 13. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 15 is a flowchart illustrating an exemplary method implemented in a communication system, such as, for example, the communication system of FIG. 12, in accordance with one embodiment. The communication system may include a host computer 24, a network node 16 and a WD 22, which may be those described with reference to FIGS. 12 and 13. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 16, 17:
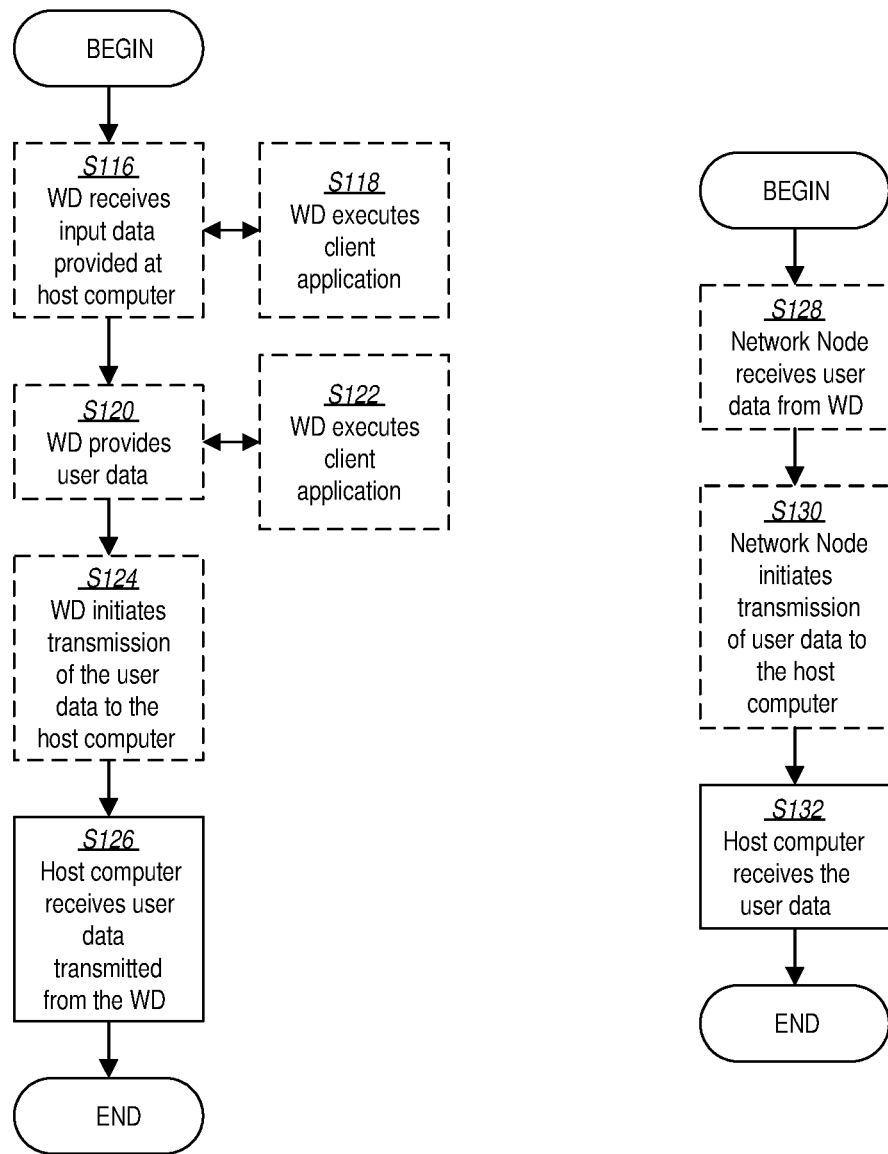
FIG. 16 is a flowchart illustrating exemplary methods implemented in a communication system including a host computer, a network node and a wireless device for receiving user data from the wireless device at a host computer according to some embodiments of the present disclosure.
FIG. 17 is a flowchart illustrating exemplary methods implemented in a communication system including a host computer, a network node and a wireless device for receiving user data at a host computer according to some embodiments of the present disclosure.

FIG. 16 is a flowchart illustrating an exemplary method implemented in a communication system, such as, for example, the communication system of FIG. 12, in accordance with one embodiment. The communication system may include a host computer 24, a network node 16 and a WD 22, which may be those described with reference to FIGS. 12 and 13. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 17 is a flowchart illustrating an exemplary method implemented in a communication system, such as, for example, the communication system of FIG. 12, in accordance with one embodiment. The communication system may include a host computer 24, a network node 16 and a WD 22, which may be those described with reference to FIGS. 12 and 13. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 18:
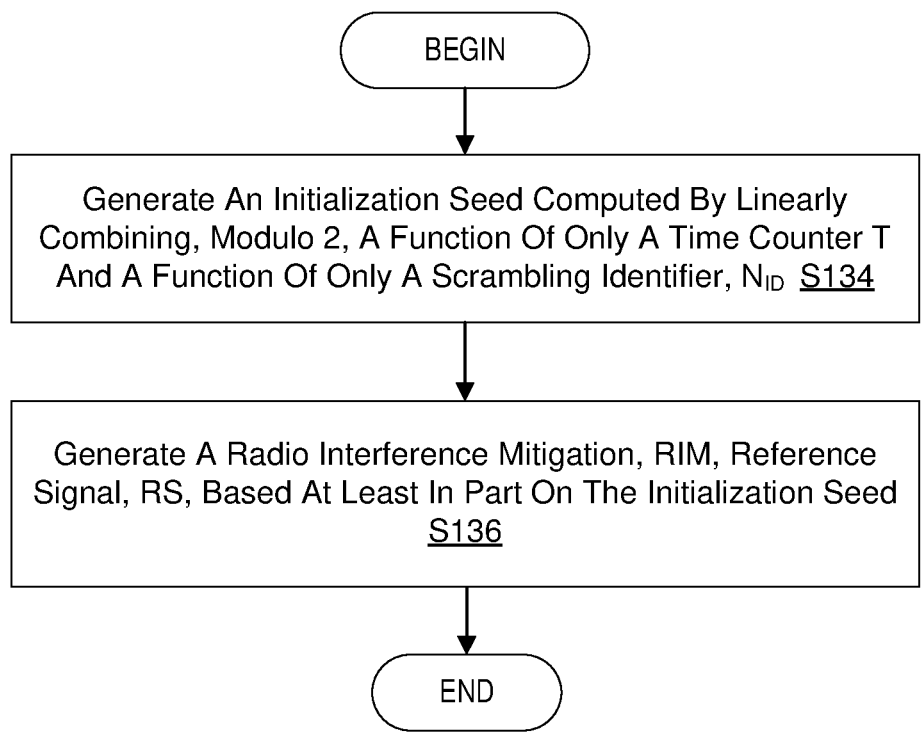
FIG. 18 is a flowchart of an exemplary process in a network node for scrambling radio interference mitigation reference signal (RIM-RS) sequences according to some embodiments of the present disclosure.

FIG. 18 is a flowchart of an exemplary process in a network node 16 for scrambling an RIM-RS sequence in accordance with the principles of the present disclosure. One or more blocks described herein may be performed by one or more elements of network node 16 such as by one or more of processing circuitry 68 (including the seed generator unit 32 and RIM-RS generator unit 76), processor 70, radio interface 62 and/or communication interface 60. Network node 16 such as via processing circuitry 68 and/or processor 70 and/or radio interface 62 and/or communication interface 60 is configured to generate an initialization seed computed by linearly combining, modulo 2, a function of only a time counter t and a function of only a scrambling identifier, $N_{ID}$ (Block S134). The process is further configured to generate a radio interference mitigation, RIM, reference signal, RS, based at least in part on the initialization seed (Block S136). It is once again noted that the term "only" as used in this context refers to cases where a function only dependent on a time counter t means that the function is dependent on the time counter t but not on the scrambling identifier NID, and that a function only dependent on a scrambling identifier MD means that the function is dependent on the scrambling identifier MD but not on the time counter t.

Figure 19:
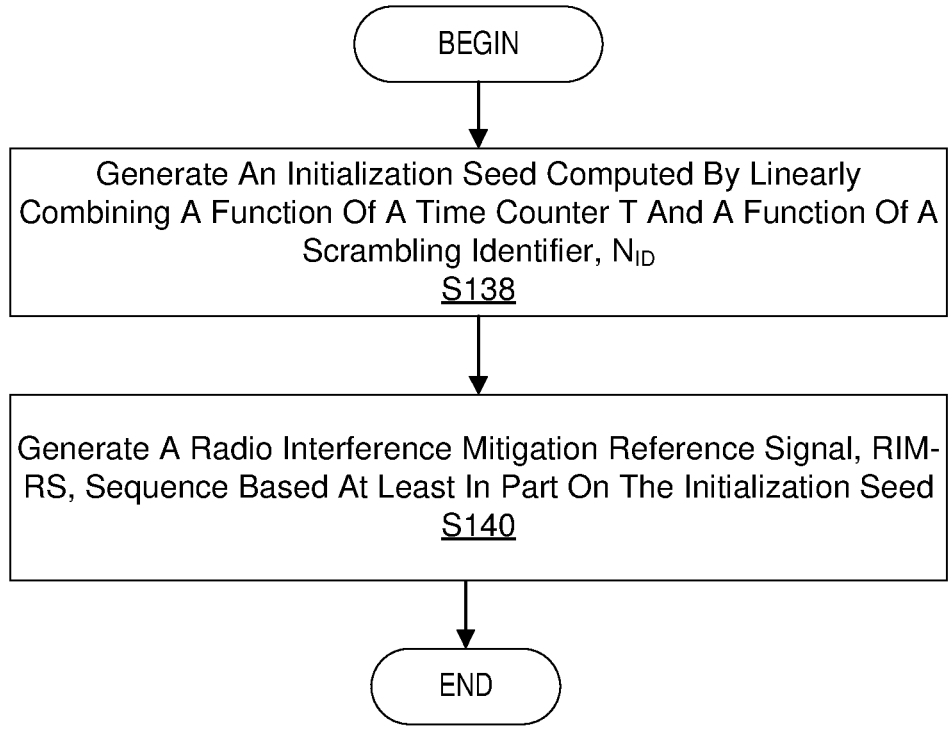
FIG. 19 is a flowchart of another exemplary process in a network node for scrambling radio interference mitigation reference signal (RIM-RS) sequences according to some embodiments of the present disclosure.

FIG. 19 is a flowchart of an exemplary process in a network node 16 for generating an RIM-RS sequence in accordance with the principles of the present disclosure. One or more blocks described herein may be performed by one or more elements of network node 16 such as by one or more of processing circuitry 68 (including the seed generator unit 32 and RIM-RS generator unit 76), processor 70, radio interface 62 and/or communication interface 60. Network node 16 such as via processing circuitry 68 and/or processor 70 and/or radio interface 62 and/or communication interface 60 is configured to generate (Block S138) an initialization seed computed by linearly combining a function of a time counter t and a function of a scrambling identifier, MD, and generating (Block S140) a radio interference mitigation reference signal, RIM-RS, sequence based at least in part on the initialization seed. In some embodiments, the RIM-RS is transmitted in order to convey information about interference caused by another network node to the network node 16. Further, in some embodiments, the RIM-RS is transmitted when the other network node is causing interference to the network node 16.

Having described the general process flow of arrangements of the disclosure and having provided examples of hardware and software arrangements for implementing the processes and functions of the disclosure, the sections below provide details and examples of arrangements for generating a radio interference mitigation reference signal (RIM-RS) sequence.

Some embodiments make use of a sequence-initialization seed $c_{init}$ as a function of a time counter t and a configured scrambling ID $N_{ID}$. The sequence initialization seed may be generated by the seed generator unit 32 as:

$$c_{init} = 2^A \cdot \mathrm{mod}(t \cdot Z, 2^C) + 2^B \cdot N_{ID},$$

where A, B and C are parameters which may be either configured or pre-defined in by specification. Or alternatively $c_{init}$ is defined as (equivalent if A, B and C are chosen respecting the 31-bit limitation) as:

$$c_{init} = \mathrm{mod}(2^A \cdot \mathrm{mod}(t \cdot Z, 2^C) + 2^B \cdot N_{ID}, 2^{31}).$$

A first property of these designs is that a function of only the time counter t and a function of only the configured scrambling ID $N_{ID}$ are linearly combined in a modulo-2 sense. This may, for example, be achieved by setting the value range of $N_{ID}$ so as to only span A bits and map the function of only the time counter t to the 31-A most significant bits (MSBs) of the sequence initialization seed, while mapping the scrambling ID to the A least significant bits (LSBs) of the sequence initialization seed. Thus, in some embodiments B may be equal to 0 to accomplish this.

As stated, in some embodiments, A may be equal to the bit width of $N_{ID}$, and C may be equal to 31-A-B in order to fill up the entire 31-bit space available.

In some embodiments, it may be useful to allocate approximately equal number of bits of the 31 bits available to the time counter and the scrambling ID respectively, which implies A may be equal to 15.

The time counter t may depend on the slot number, the symbol index in the slot, or the frame number in some embodiments. In other embodiments, the time counter t is a counter of RIM-RS transmission occasions, which may typically occur once in a TDD pattern or every other TDD pattern. In other embodiments, the time counter is counted up every Nth TDD pattern or RIM-RS transmission occasion.

Thus, for an implementation having A=0, and B=C, then a maximum bit width of $N_{ID}$ is 31-B.

A second property of some embodiments is to select, via the processor 70, the function which depends only on the time counter t so as to not be linearly increasing with each step of the time counter. The selected function may also depend on a configured parameter Z which shifts the sequence in an eavesdropper mode, to be aware of the sequence formula but not the value Z. This is beneficial from a security perspective since an eavesdropper based on observing a sequence at a certain time simply cannot derive the following sequence at the next time slot.

In some embodiments, Z may be a prime number. In a typical operation mode, Z may be known to all nodes in the network and for instance configured to them via OAM, but does need not be transmitted over air where a potential eavesdropper could listen in.

As stated, Z may be signaled to all gNBs in the network, either over a standardized or proprietary interface, or Z may be pre-defined.

If Z is a prime number, we have that $\mod(t \cdot Z, 2^C)$ will take all values $0 \ldots (2^C-1)$ if $t=0 \ldots (2^C-1)$. This is beneficial as this choice of Z maximizes the number of unique sequences, e.g., RIM-RS sequences, transmitted.

If Z is unknown to a jammer the correct sequence cannot be generated even if t is known (as it typically is). Determining Z from OTA measurements is not straightforward. An implementation may change Z regularly (and also reconfigure $N_{ID}$).

The Gold sequence generation mechanism is based on the modulo-2 additions of two m-sequences $$c(t, n_{ID}) = x_1 \oplus x_2(t, n_{ID})$$

(where $\oplus$ is addition in modulo-2 sense, or XOR (XOR is a logic exclusive OR)) where the m-sequence $x_1$ is initialized with a fixed seed (independent of configuration) and where the initialization of the m-sequence $x_2$ is a function of the symbol counter, i.e., the time counter t, and the scrambling ID. In case the symbol counter is linearly combined in modulo 2 sense with the ID (if A,B are selected appropriately), such as $c_{init} = 2^A(t) + 2^B n_{ID}$, the second m-sequence can be expressed as $$x_2(t, n_{ID}) = x_2^{(1)}(t) \oplus x_2^{(2)}(n_{ID})$$

which follows by noting that m-sequences are linear functions of the initializer (in modulo-2 sense). We observe that if the symbol counter and the scrambling ID are combined linearly (in modulo 2 sense), we may then expect that cross-correlations between Gold sequences generated from two different scrambling IDs to be consistent across time as $$c(t, n_{ID1}) = x_1 \oplus x_2^{(1)}(t) \oplus x_2^{(2)}(n_{ID1})$$

$$c(t, n_{ID2}) = x_1 \oplus x_2^{(1)}(t) \oplus x_2^{(2)}(n_{ID2})$$

Thus, a symbol counter or a function of the symbol counter is offset (in the sense of linear addition) by a function of the scrambling ID. This gives superior consistence of correlation properties over time.

According to one aspect, a method implemented in a network node 16 for scrambling radio interference mitigation reference signal (RIM-RS) sequences is provided. The method includes generating an initialization seed computed by linearly combining, modulo 2, a function of only a time counter t and a function of only a scrambling identifier, $N_{ID}$. The method further includes generating a radio interference mitigation, RIM, reference signal, RS, based at least in part on the initialization seed.

According to this aspect, in some embodiments, the initialization seed may be computed as:

$$c_{init} = 2^A \cdot \mod(t \cdot Z, 2^C) + 2^B \cdot N_{ID},$$

where Z may be a prime number and A, B and C are constants selected to place bits dependent on t and bits dependent on $N_{ID}$ on separate parts of a bit field of $c_{init}$. In some embodiments, the initialization seed fits into a 31-bit linear feedback sequence register associated with a length 31 Gold sequence generator.

In accordance with one embodiment, a network node 16 configured to communicate with a wireless device is provided. The network node 16 is configured to generate an initialization seed computed by linearly combining a function of a time counter t and a function of a scrambling identifier, $N_{ID}$, and generate a radio interference mitigation reference signal, RIM-RS, sequence based at least in part on the initialization seed. In some embodiments, the processing circuitry 68 of the network node 16 is configured to perform these functions.

In accordance with an aspect of this embodiment, the initialization seed fits into a 31-bit linear feedback sequence register associated with a length 31 Gold sequence generator. In accordance with another aspect of this embodiment, the time counter t counts RIM-RS transmission occasions. In accordance with another aspect of this embodiment, the function of the time counter t is based on a parameter chosen to maximize a number of unique RIM-RS sequences. In accordance with another aspect of this embodiment, the function of the time counter t is based on a parameter chosen to shift the initialization seed. In accordance with still another aspect of this embodiment, the parameter chosen to shift the initialization seed is a prime number. In accordance with another aspect of this embodiment, the linear combining is modulo 2. In accordance with yet another aspect of this embodiment, the initialization seed computed by linear combining is linearly combined such that bits dependent on t and bits dependent on $N_{ID}$ are placed on separate parts of a bit field of the initialization seed. In accordance with another aspect of this embodiment, the network node 16 is further optionally configured to transmit, based on or using the generated RIM-RS sequence, a RIM-RS for reception by another network node 16.

Another embodiment provides a method implemented in a network node 16, in which the method includes generating (Block S138) an initialization seed computed by linearly combining a function of a time counter t and a function of a scrambling identifier, $N_{ID}$, and generating (Block S140) a radio interference mitigation reference signal, RIM-RS, sequence based at least in part on the initialization seed.

In accordance with an aspect of this embodiment, the initialization seed fits into a 31-bit linear feedback sequence register associated with a length 31 Gold sequence generator. In accordance with another aspect of this embodiment, the time counter t counts RIM-RS transmission occasions. In accordance with another aspect of this embodiment, the function of the time counter t is based on a parameter chosen to maximize a number of unique RIM-RS sequences. In accordance with another aspect of this embodiment, the function of the time counter t is based on a parameter chosen to shift the initialization seed. In accordance with still another aspect of this embodiment, the parameter chosen to shift the initialization seed is a prime number. In accordance with another aspect of this embodiment, the linear combining is modulo 2. In accordance with yet another aspect of this embodiment, the initialization seed computed by linear combining is linearly combined such that bits dependent on t and bits dependent on $N_{ID}$ are placed on separate parts of a bit field of the initialization seed. In accordance with another aspect of this embodiment, the method includes optionally transmitting, based on or using the generated RIM-RS sequence, a RIM-RS for reception by another network node.

SOME EXAMPLES

Example A1

A network node configured to communicate with a wireless device (WD), the network node configured to, and/or comprising a radio interface and/or comprising processing circuitry configured to:
generate an initialization seed computed by linearly combining, modulo 2, a function of only a time counter t and a function of only a scrambling identifier, $N_{ID}$; and
generate a radio interference mitigation, RIM, reference signal, RS, based at least in part on the initialization seed.

Example A2

The network node of Example A1, wherein the initialization seed is computed as:

$$c_{init} = 2^A \cdot \mathrm{mod}(t \cdot Z, 2^C) + 2^B \cdot N_{ID},$$

where Z is a prime number and A, B and C are constants selected to place bits dependent on t and bits dependent on $N_{ID}$ on separate parts of a bit field of $c_{init}$.

Example A3

The network node of Example A1, wherein the initialization seed fits into a 31-bit linear feedback sequence register associated with a length 31 Gold sequence generator.

Example B1

A method implemented in a network node, the method comprising:
generating an initialization seed computed by linearly combining, modulo 2, a function of only a time counter t and a function of only a scrambling identifier, $N_{ID}$; and
generating a radio interference mitigation, RIM, reference signal, RS, based at least in part on the initialization seed.

Example B2

The method of Example B1, wherein the initialization seed is computed as:

$$c_{init} = 2^A \cdot \mathrm{mod}(t \cdot Z, 2^C) + 2^B \cdot N_{ID},$$

where Z is a prime number and A, B and C are constants selected to place bits dependent on t and bits dependent on $N_{ID}$ on separate parts of a bit field of $c_{init}$.

Example B3

The method of Example B1, wherein the initialization seed fits into a 31-bit linear feedback sequence register associated with a length 31 Gold sequence generator.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings.

It will be understood that it would be unduly repetitious and obfuscating to literally describe and illustrate every combination and subcombination of these embodiments. Accordingly, all embodiments can be combined in any way and/or combination, and the present specification, including the drawings, may be construed to constitute a complete written description of all combinations and subcombinations of the embodiments described herein, and of the manner and process of making and using them, and may support claims to any such combination or subcombination.

Abbreviations that may be used in the preceding description include:

| Abbreviation | Explanation |
| --- | --- |
| CP | Cyclic Prefix |
| CRS | Common RS |
| CSI-RS | Channel State Information RS |
| DM-RS | Demodulation RS |
| ID | Identifier |
| LFSR | Linear Feedback Shift Register |
| NR | New Radio |
| PRBS | Pseudo-Random Binary Sequence |
| RS | Reference signal |
| SCS | Subcarrier spacing |
| TRS | Tracking RS |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node for enabling mitigation of remote interference from another network node to communications between the network node and a wireless device (WD), the network node comprising processing circuitry configured to:
generate an initialization seed as a function of a time counter t and a scrambling identifier $N_{ID}$, the initialization seed computed by linearly combining, in a modulo 2 sense, a function of only the time counter t and a function of only the scrambling identifier $N_{ID}$, such that bits dependent on t and bits dependent on $N_{ID}$ are placed on separate parts of a bit field of the initialization seed; and
generate a remote interference mitigation reference signal (RIM-RS) sequence based at least in part on the initialization seed.

2. The network node of claim 1, wherein the initialization seed fits into a 31-bit linear feedback sequence register associated with a length 31 Gold sequence generator.

3. The network node of claim 2, wherein the time counter t is a counter of RIM-RS transmission occasions.

4. The network node of claim 2, wherein the function of the time counter t is based on a parameter Z chosen to shift the initialization seed.

5. The network node of claim 2, wherein the network node is further configured to transmit, based on or using the generated RIM-RS sequence, a RIM-RS for reception by the another network node.

6. The network node of claim 1, wherein the time counter t is a counter of RIM-RS transmission occasions.

7. The network node of claim 1, wherein the function of the time counter t is based on a parameter Z chosen to shift the initialization seed.

8. The network node of claim 7, wherein the parameter Z chosen to shift the initialization seed is a prime number.

9. The network node of claim 1, wherein the network node is further configured to transmit, based on or using the generated RIM-RS sequence, a RIM-RS for reception by the another network node.

10. A method implemented in a network node for enabling mitigation of remote interference from another network node to communication between the network node and a wireless device (WD), the method comprising:
generating an initialization seed as a function of a time counter t and a scrambling identifier $N_{ID}$, the initialization seed computed by linearly combining, in a modulo 2 sense, a function of only the time counter t and a function of only the scrambling identifier $N_{ID}$, such that bits dependent on t and bits dependent on $N_{ID}$ are placed on separate parts of a bit field of the initialization seed; and
generating a remote interference mitigation reference signal (RIM-RS) sequence based at least in part on the initialization seed.

11. The method of claim 10, wherein the initialization seed fits into a 31-bit linear feedback sequence register associated with a length of 31 Gold sequence generator.

12. The method of claim 11, wherein the time counter t is a counter of RIM-RS transmission occasions.

13. The method of claim 11, wherein the function of the time counter t is based on a parameter Z chosen to shift the initialization seed.

14. The method of claim 11, further comprising transmitting, based on or using the generated RIM-RS sequence, a RIM-RS for reception by another network node.

15. The method of claim 10, wherein the time counter t is a counter of RIM-RS transmission occasions.

16. The method of claim 10, wherein the function of the time counter t is based on a parameter Z chosen to shift the initialization seed.

17. The method of claim 16, wherein the parameter Z chosen to shift the initialization seed is a prime number.

18. The method of claim 17, further comprising transmitting, based on or using the generated RIM-RS sequence, a RIM-RS for reception by another network node.

19. The method of claim 10, further comprising transmitting, based on or using the generated RIM-RS sequence, a RIM-RS for reception by another network node.

* * * * *